United States Patent
Ramalingam et al.

(10) Patent No.: US 9,612,642 B2
(45) Date of Patent: Apr. 4, 2017

(54) EVENT-BASED POWER PROVISIONING SYSTEM

(71) Applicant: Dell Products L.P., Round Rock, TX (US)

(72) Inventors: Purushothaman Ramalingam, Chennai (IN); Premnath Sundarababu, Chennai (IN)

(73) Assignee: Dell Products L.P., Round Rock, TX (US)

( * ) Notice: Subject to any disclaimer, the term of this patent is extended or adjusted under 35 U.S.C. 154(b) by 13 days.

(21) Appl. No.: 14/726,036

(22) Filed: May 29, 2015

(65) Prior Publication Data

US 2016/0349821 A1 Dec. 1, 2016

(51) Int. Cl.
*G06F 1/00* (2006.01)
*G06F 1/32* (2006.01)

(52) U.S. Cl.
CPC .......... *G06F 1/3209* (2013.01); *G06F 1/3203* (2013.01); *G06F 1/325* (2013.01); *G06F 1/329* (2013.01); *Y02B 60/144* (2013.01)

(58) Field of Classification Search
CPC ........ G06F 1/325; G06F 1/329; G06F 1/3203; G06F 1/3209; Y02B 60/144
See application file for complete search history.

(56) References Cited

U.S. PATENT DOCUMENTS

| | | | | |
|---|---|---|---|---|
| 7,814,357 B2* | 10/2010 | Koper | ................... | G06F 1/3203 713/300 |
| 8,099,616 B2* | 1/2012 | Feldman | ............... | G06F 1/3203 713/300 |
| 9,088,434 B2* | 7/2015 | Diab | | |
| 2007/0288784 A1* | 12/2007 | Koper | ................... | G06F 1/3203 713/324 |
| 2009/0112373 A1* | 4/2009 | Feldman | ............... | G06F 1/3203 700/286 |
| 2015/0244535 A1* | 8/2015 | Chen | ...................... | H04L 12/10 713/300 |

* cited by examiner

*Primary Examiner* — M Elamin
(74) *Attorney, Agent, or Firm* — Haynes and Boone, LLP

(57) ABSTRACT

A power provisioning system includes power sourcing equipment having a plurality of ports. The power source equipment is configured to provide power to each of the plurality of the ports. A plurality of powered devices are each coupled to at least one of the plurality of ports. A controller is coupled to the power sourcing equipment through a network. The controller receives event information, determines that the event information corresponds to a first powered device of the plurality of powered devices and, in response, instructs the power sourcing equipment to provide power to the first powered device through the at least one of the plurality of ports that are coupled to the first powered device. In different embodiments, the event information may include an identification or authorization of a user, a determination that a scheduled area use is occurring, or the receiving of an emergency alert.

20 Claims, 13 Drawing Sheets

EVENT-BASED POWER PROVISIONING SYSTEM

BACKGROUND

The present disclosure relates generally to information handling systems, and more particularly to a power provisioning system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be coupled together via networks such as, for example, wired Ethernet networks, and equipment has been developed that is capable of powering information handling systems via the wired connections that provide those wired networks (i.e., negating the need for a separate power connection). The Institution of Electrical and Electronics Engineers (IEEE) developed IEEE 802.3 as the collection of standards that specifies the provisioning of Power over Ethernet (PoE). Generally, PoE systems operate by delivering power from power sourcing equipment to a powered device (e.g., Internet Protocol (IP) cameras, IP card readers, IP phones, wireless access points, etc.) that is connected to that power sourcing equipment.

However, as more and more powered devices are provided in a network and connected to power sourcing equipment (e.g., network switches, routers, or hubs), the power consumption of those powered devices can raise issues. Conventionally, powered devices connected to power sourcing equipment are provided power as long as they are connected to the power sourcing equipment, which is energy inefficient, particularly when the powered devices are not being used. Conventional solutions to this problem involves providing static schedules that define the times during which the powered devices will be provided power from the power sourcing equipment (e.g., Monday through Friday during work hours such as 8 a.m. to 6 p.m.). However, different users may have different schedules and some powered devices may not be used regularly by any users, and thus the need to use particular powered devices at different times (often outside of normal work hours by a user) and such static schedules may not provide for the provisioning of power by the power sourcing equipment to the powered devices according to those users' needs. In such situations, the static schedules must be adjusted per each user's need(s), which presents difficulties as the number of users in a network increases.

Accordingly, it would be desirable to provide an improved power provisioning system

SUMMARY

According to one embodiment, an information handling system (IHS) includes a communication system that is configured to couple to a network; a processing system that is coupled to the communication system; and a memory system that is coupled to the processing system and that includes instruction that, when executed by the processing system, cause the processing system to provide an event powering engine that is configured to: receive, using the communication system, first event information through the network; determine that the first event information corresponds to a first powered device in an event database; and send an instruction to power sourcing equipment that is coupled to the network to provide power to a first powered device through at least one port that is included on the power sourcing equipment and that is coupled to the first powered device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
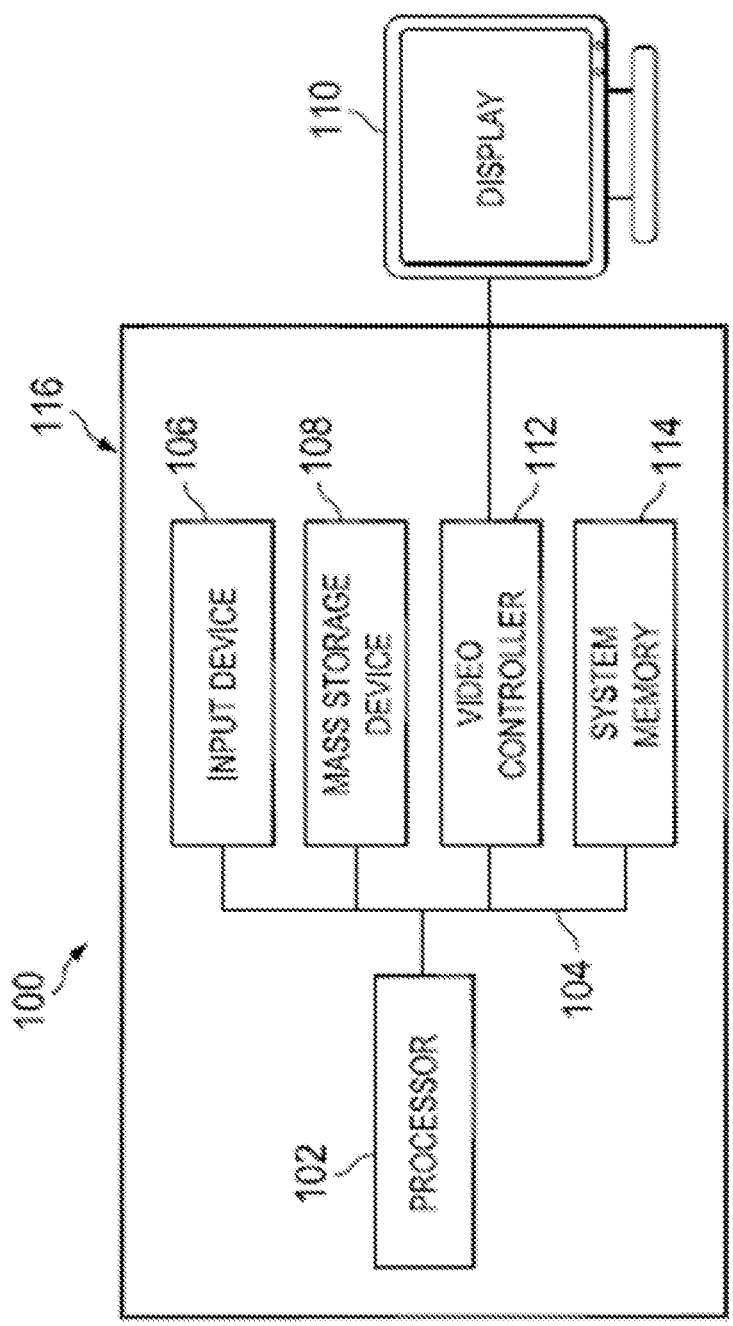
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
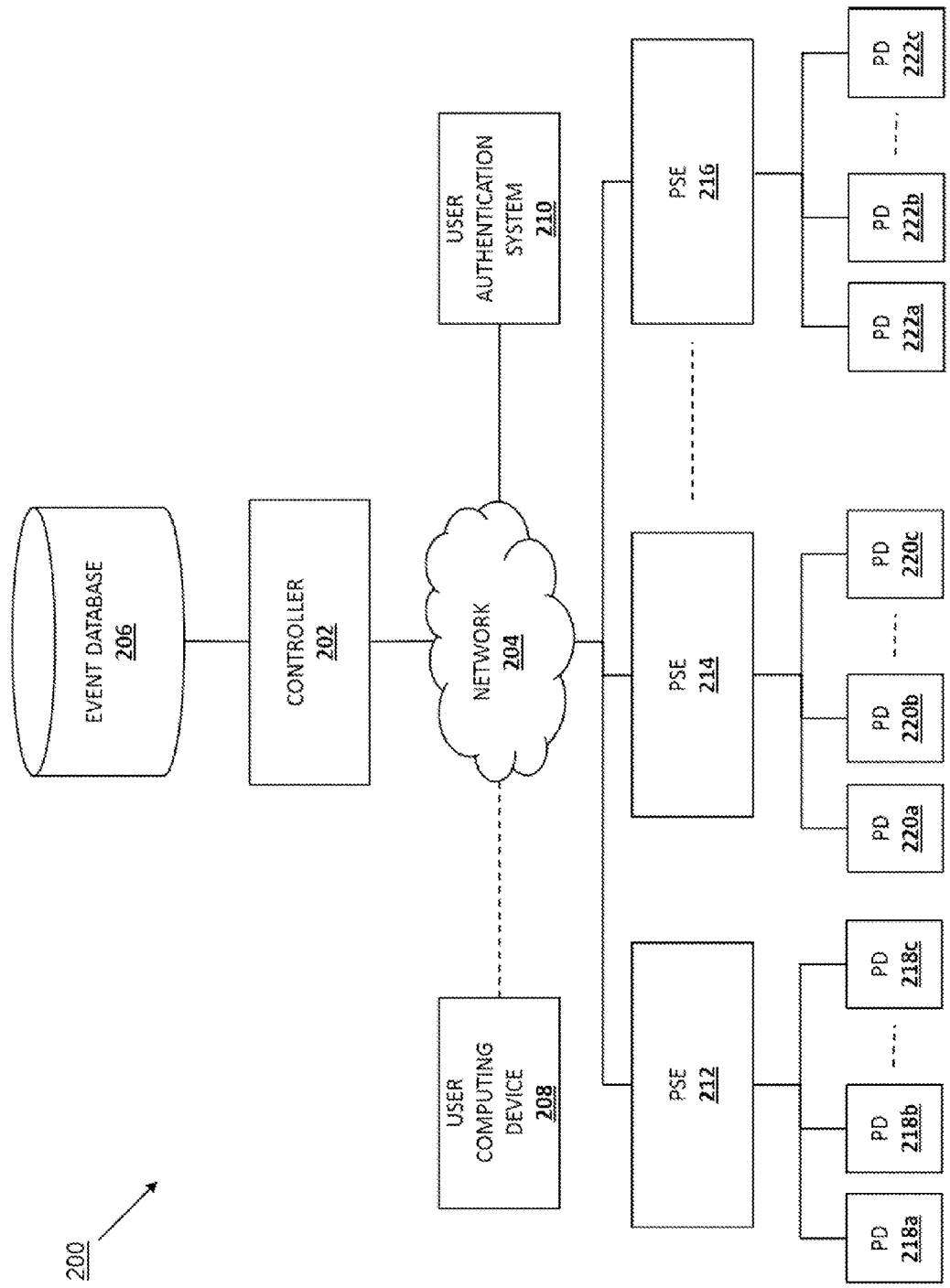
FIG. 2 is a schematic view illustrating an embodiment of a power provisioning system.

Referring now to FIG. 2, an embodiment of a power provisioning system 200 is illustrated. In the illustrated embodiment, the power provisioning system 200 includes a controller 202 that is coupled to a network 204 and to an event database 206. As discussed below, in some embodiments, a user computing device 208 and/or a user authentication system 210 may be coupled to the network 204 as well. A plurality of power sourcing equipment (PSE) may be coupled to the network 204, and in the illustrated embodiment include a PSE 212, a PSE 214, and up to a PSE 216. While only three PSE's are illustrated in the embodiment of FIG. 2, any number of PSEs may be provided in the power provisioning system 200 while remaining within the scope of the present disclosure. One or more powered devices may be coupled to each of the PSEs 212, 214, and up to 216. For example, in the illustrated embodiment, powered devices 218a, 218b, and up to 218c are coupled to the PSE 212, powered devices 220a, 220b, and up to 220c are coupled to the PSE 214; and powered devices 222a, 222b, and up to 222c are coupled to the PSE 216.

The controller 202 is discussed in further detail below with reference to FIG. 3, and may be provided using a variety of different types of controller systems that may be configured to perform the controller functionality discussed below. In different embodiments, the network 204 may be implemented as a single network or a combination of multiple networks. For example, in various embodiments, the network 204 may include the Internet and/or or one more intranets, landline networks, wireless networks, and/or other networks known in the art.

In an embodiment, the event database 206 may be included on a storage device (e.g., the storage device 108 discussed above with reference to FIG. 1.) While the event database 206 is illustrated as being a separate component from the controller 202 in FIG. 2, in some embodiments, the event database 206 may be included as part of the controller 202 (e.g., in a storage device included in the controller 202) while remaining within the scope of the present disclosure. However, in other embodiments, the event database 206 may be provided on a storage device that is separate from the controller (e.g., included in a server) and coupled to the controller 202 through the network 204. Furthermore, any type of database provided on any storage subsystem that is accessible by the controller 202 is envisioned as falling within the scope of the present disclosure. In different embodiments, the event database 206 may store a variety of network information and/or event definitions that may depend on the specific functionality desired by the power provisioning system 200 that is discussed below.

In some embodiments, the network information stored in the event database 206 may include mapping information that associates a user with a powered device, associates a powered device with a port on a PSE to which that powered device is connected, and/or that includes a variety of other associations that provide the functionality discussed below. For example, a user may have an office that includes a powered IP phone that is coupled to particular port(s) on a PSE and, as such, the network information may associate an identifier for that user with an identifier for that powered IP phone, and may also associate the identifier for that powered IP phone with one or more identifiers for the particular port(s) on that PSE to which that powered IP phone is connected. In another example, an office may have a conference or meeting room that includes a powered IP phone that is coupled to particular port(s) on a PSE and, as such, the network information may associate an identifier for that conference or meeting room with an identifier for that powered IP phone, and may also associate the identifier for that powered IP phone with one or more identifiers for the particular port(s) on that PSE to which that powered device is connected. In another example, an office may have a shared area (e.g., a lobby, a bathroom, etc.) that includes a powered IP phone that is coupled to particular port(s) on a PSE and, as such, the network information may associate an identifier for that shared area with an identifier for that powered IP phone, and may also associate the identifier for that powered IP phone with one or more identifiers for the particular port(s) on that PSE to which that powered device is connected.

In some embodiments, the network information may be provided by a network administrator. For example, a network administrator may provide a topology of a physical location that identifies or otherwise includes offices, cubes, conference rooms, restrooms, and/or other office elements, as well as identifiers for each powered IP phone associated with each office element, and the network administrator may then assign or otherwise associate users with those office elements. In other embodiments, the network information may be determined by the controller 202. For example, the controller 202 may include a topology of a physical location that includes office elements, and that controller 202 may automatically detect the installation of PSE's and powered devices in the office, as well as automatically determine which users use the powered devices (e.g., via detecting a number of user authentications for an office that includes a particular powered IP phone and/or receiving/retrieving other user identifying information that is directed to particular office elements). In a specific embodiment, the connection of a powered device to a PSE causes network information for that powered device to be automatically populated in the event database 206. While a few specific examples have been provided that include powered IP phones, one of skill in the art will recognize that network information in the event database 206 may provide a variety of different associations between a variety of different powered devices, PSE ports, users, and/or physical location elements while remaining within the scope of the present disclosure.

In some embodiments, the event definitions stored in the event database 206 may define one or more events that include actions or occurrences in the power provision system 200 that may be reported to the controller 202 as discussed below. For example, event definitions may include an user identification event for a user, a user authentication event for a user, a computing device identification event for a user computing device, a computing device authentication event for a user computing device, a scheduling event for a meeting room use, a variety of emergency situation events (e.g., a fire alarm detection, a gas leak detection, etc.), and/or a variety of other event definitions that will be apparent to one of skill in the art in possession of the present disclosure. Thus, while several specific examples of event definitions are provided herein, one of skill in the art in possession of the present disclosure will recognize that other events and event definitions will fall within the scope of the present disclosure.

In an embodiment, the user computing device 208 may be the IHS 100 discussed above with reference to FIG. 1 and/or may include some or all of the components of the IHS 100. For example, the user computing device 208 may be a desktop computer, a laptop/notebook computer, a tablet computer, a phone, and/or a variety of other computing devices known in the art. In an embodiment, the user authentication system 210 may be provided by the IHS 100 discussed above, and/or may include some or all of the components of the IHS 100. In the embodiments discussed below, the user authentication system 210 is a security system that is configured to authenticate users for entering a physical location. However, the user authentication system 210 may be any of a variety of authentication and/or identification systems that are configured to authenticate or identify data, authenticate or identify entities, authenticate or identify computing systems, and/or perform a variety of other authentication and/or identification functions known in the art. In the examples provided below, the user authentication system 210 is used in the power provisioning system 200 to identify and, in some embodiments, authenticate a user or a computing system in order to determine a powered device to which power should be provisioned. As such, the user authentication system 210 is described as including a machine that is located at an entrance of a physical location (e.g., a building or office) and with which a user may interact (i.e., engaging an identification card, presenting biometric information, etc.) in order to provide identity and/or authentication data. As such, the user authentication system 210 may include a database or other storage system that stores identity data, authentication data, and/or other data associated with user, computing systems, and/or other entities in the power provisioning system 200.

Each of the PSEs 212, 214, and 216 is discussed in further detail below with reference to FIG. 4, and may be provided using a variety of different types of power sourcing equipment systems that are configured to perform the PSE functionality discussed below. In an embodiment, each of the powered devices may be coupled to their respective PSEs via one or more ports on that PSE. For example, a cable (e.g., an Ethernet cable) may be used to connect any of the powered devices to any of the ports on any of the PSEs. In different embodiments, the powered devices may include wireless access points, IP phones, IP cameras, and/or a variety of other powered devices known in the art. As discussed below, the PSEs 212, 214, and 216, as well as their powered devices 218a-c, 220a-c, and 222a-c, may include Power over Ethernet (PoE) systems or subsystems, and may be configured to implement the Power over Ethernet (PoE) standard to provide and/or receive power over Ethernet cables. However, other (e.g., future) powering standards may benefit from the teachings of the present disclosure and are envisioned as falling within its scope.

Figure 3:
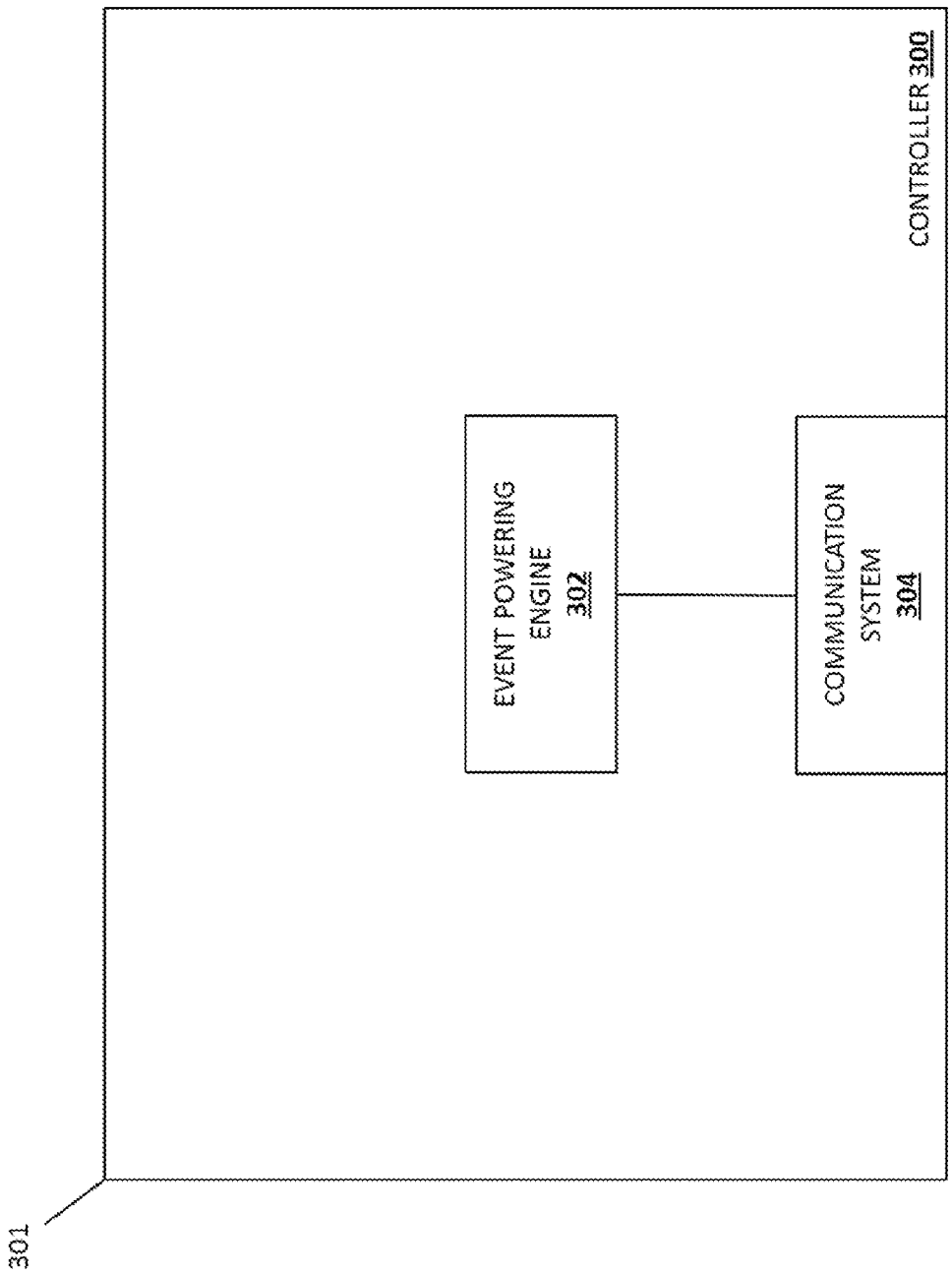
FIG. 3 is a schematic view illustrating an embodiment of a controller used in the power provisioning system of FIG. 2.

Referring now to FIG. 3, an embodiment of a controller 300 is illustrated. In an embodiment, the controller 300 may be, for example, the controller 202 in the power provisioning system 200 of FIG. 2. In an embodiment, the controller 300 may be the IHS 100 discussed above with reference to FIG. 1 and/or may include some or all of the components of the IHS 100. In specific examples discussed below, the controller 300 is a software-defined networking (SDN) controller including a variety of SDN functionality known in the art. However, the controller 300 may be provided by a variety of other controller systems known in the art while remaining within the scope of the present disclosure. The controller 300 includes a chassis 301 that houses a processing system (not illustrated, but which may include one or more of the processor 102 discussed above with reference to FIG. 1) and a memory system (not illustrated, but which may include system memory 114 discussed above with reference to FIG. 1) that includes instructions that, when executed by the processing system, cause the processing system to provide an event powering engine 302 that is configured to perform the functions of the event powering engines and/or controllers discussed below. The controller 300 also includes a communication system 304 that is housed in the chassis 301, coupled to the event powering engine 302 (e.g., via a connection between the communication system 304 and the processing system), and is configured to connect to a network (e.g., the network 204). As such, the communication system 304 may include a variety of communication system components such as, for example a Network Interface Controller (NIC), one or more ports, a wireless communication device, and/or a variety of other communication system components known in the art.

Figure 4:
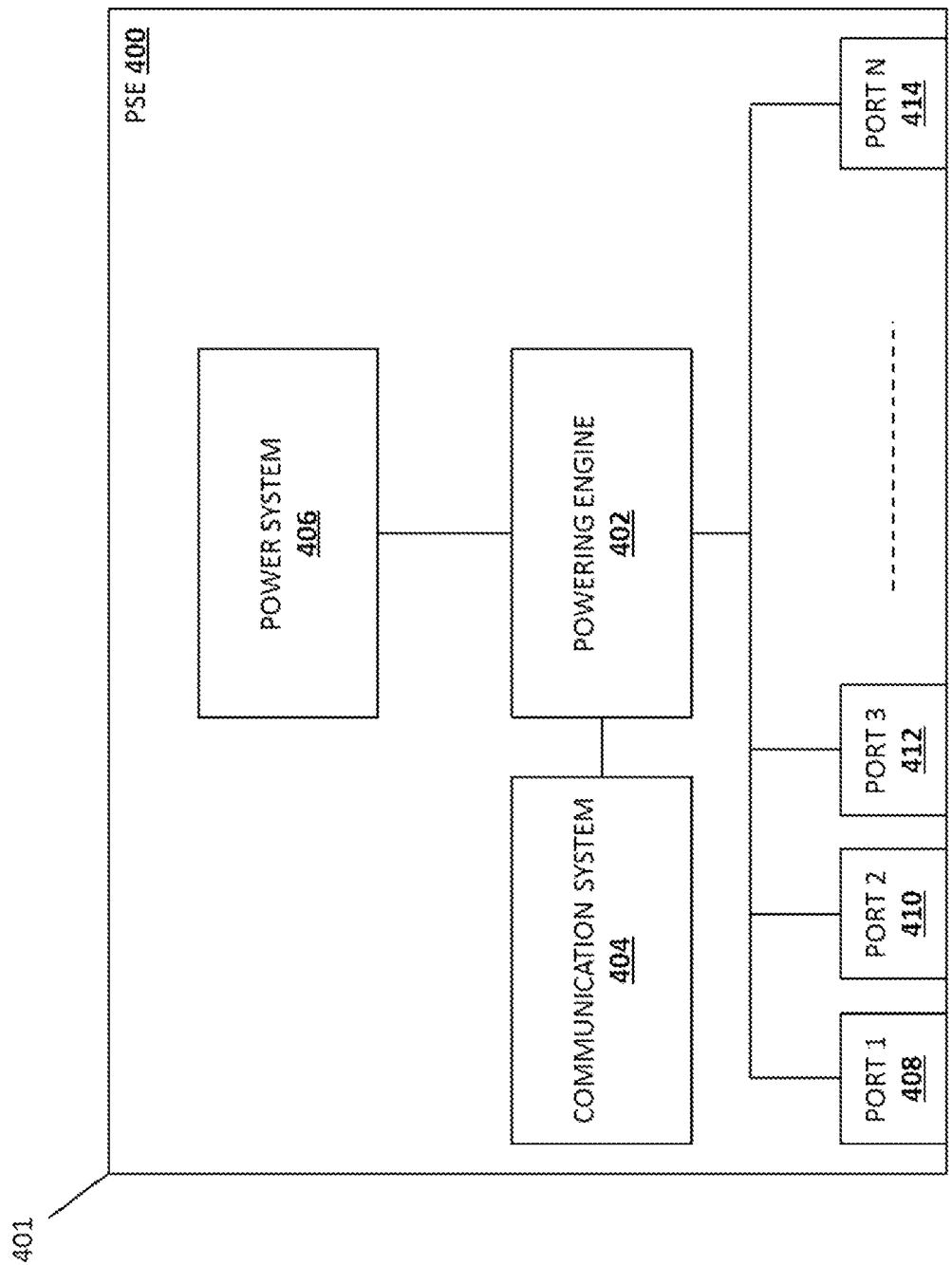
FIG. 4 is a schematic view illustrating an embodiment of power sourcing equipment used in the power provisioning system of FIG. 2.

Referring now to FIG. 4, an embodiment of a PSE 400 is illustrated. In an embodiment, the PSE 400 may be any of the PSE 212, 214, and/or 216 discussed above in the power provisioning system 200 of FIG. 2. In an embodiment, the PSE 400 may be the IHS 100 discussed above with reference to FIG. 1 and/or may include some or all of the components of the IHS 100. In specific embodiments discussed below, the PSE 400 is described as a switch, router, or other networking device known in the art. However, in other embodiments, the PSE 400 may be any computing device that is configured to provide power to a powered device (e.g., via the PoE standard through an Ethernet port and over an Ethernet cable), as discussed in further detail below. The PSE 400 includes a chassis 401 that houses a processing system (not illustrated, but which may include one or more of the processor 102 discussed above with reference to FIG. 1) and a memory system (not illustrated, but which may include system memory 114 discussed above with reference to FIG. 1) that includes instructions that, when executed by the processing system, cause the processing system to provide the powering engine 402 that is configured to perform the functions of the powering engines and/or PSEs discussed below. The powering engine 402 is coupled to communication system 404 that is housed in the chassis 401 and configured to couple to a network (e.g., the network 204). As such, the communication system 404 may include a variety of communication system components such as, for example a Network Interface Controller (NIC), a wireless communication device, and/or a variety of other communication system components known in the art.

A power system 406 is included in the chassis 401 and coupled to the powering engine 402 (e.g., by a coupling between the processing system and the power system 406). In an embodiment, the power system 406 may include a power supply unit, a power adapter, and/or a variety of other power system subsystems known in the art that are configured to receive power from a power source (e.g., and Alternating Current (AC) power source) and provide that power to components in the PSE 400. A plurality of ports 406, 408, 410, and up to 412 are coupled to the powering engine 402 (e.g., via a coupling between the processing system and the ports) and located on the chassis 401 such that they are accessible on the outer surface of the PSE 400. In the embodiments discussed below, the ports 408-414 are Ethernet ports, but in other embodiments may include other ports known in the art. In a specific example, the PSE 400 is a PoE device that is configured to provide power received by the power system 406 to one or more of the Ethernet ports 408-414, and one or more Ethernet ports 408-414 are configured to transmit that power over Ethernet cables (that are coupled to those ports).

Figure 5:
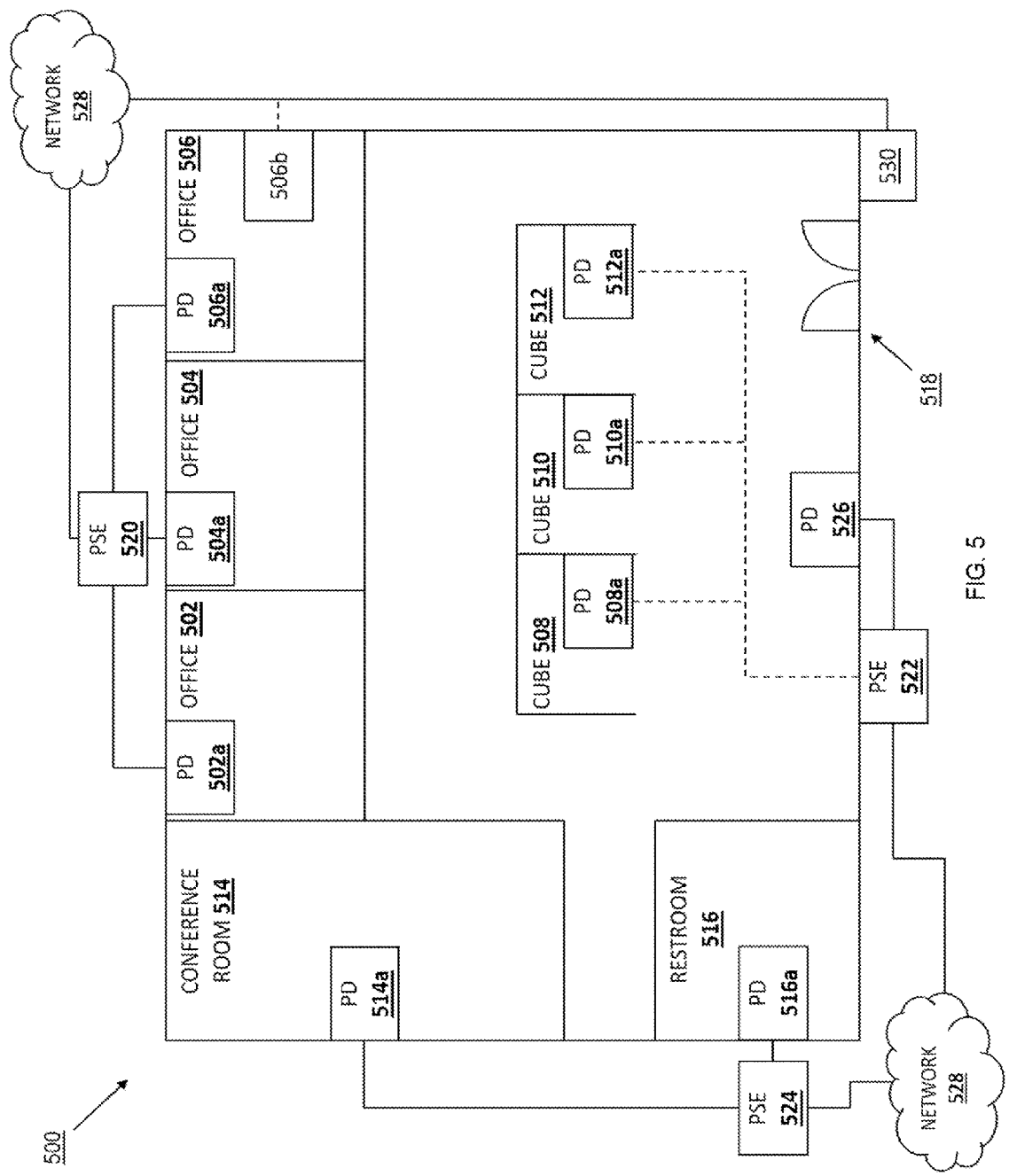
FIG. 5 is a schematic view illustrating an embodiment of a physical location used for implementing the power provisioning system of FIG. 2.

Referring now to FIG. 5, an embodiment of a physical location 500 is illustrated that provides an example of a possible implementation of the power provisioning system 200 of FIG. 2. In the illustrated embodiment, the physical location 500 includes a plurality of offices 502, 504, and 506; a plurality of cubes 508, 510, and 512; a conference room 514; and a restroom 516. A door 518 is provided as an entrance of the physical location 500. While the physical location 500 is illustrated and described as a business office 500, the power provisioning system 200 may be implemented in any of a variety of types of physical locations such as, for example, homes, stores, warehouses, and/or a variety of other physical locations known in the art.

Each of the offices 502, 504, and 506 may include a respective powered device that is coupled to a PSE (which may be any of the powered devices and PSEs in the power provisioning system 200 discussed above with reference to FIG. 2). In the illustrated embodiment, the office 502 includes a powered IP phone 502a, the office 504 includes a powered IP phone 504a, the office 506 includes a powered IP phone 506a, and each of the powered IP phones 502a, 504a, and 506a are coupled to a PSE 520. Each of the cubes 508, 510, and 512 may include a respective powered device that is coupled to a PSE (which may be any of the powered devices and PSEs in the power provisioning system 200 discussed above with reference to FIG. 2). In the illustrated embodiment, the cube 508 includes a powered IP phone 508a, the cube 510 includes a powered IP phone 510a, the cube 512 includes a powered IP phone 512a, and each of the powered IP phones 508a, 510a, and 512a are coupled to a PSE 522. The conference room 514 and the restroom 516 may include one or more powered devices that are coupled to a PSE (which may be any of the powered devices and PSEs in the power provisioning system 200 discussed above with reference to FIG. 2). For example, the conference room 514 includes a powered IP phone 514a and the restroom 516 includes a powered IP phone 516a, each of which is coupled to a PSE 524. A shared office area may include one or more powered devices that are coupled to a PSE (which may be any of the powered devices and PSEs in the power provisioning system 200 discussed above with reference to FIG. 2). For example, a shared office area opposite the cubes 508-512 from the offices 502-506 includes a powered IP phone 526 that is coupled to the PSE 222.

In the illustrated embodiment, the PSE 520 is coupled to a network 528, and each of the PSEs 522 and 524 are coupled to the network 528 as well (which may be the network 204 in the power provisioning system 200 of FIG. 2). In some embodiments, a user computing device 506b (which may be the user computing device 208 in the power provisioning system 200 of FIG. 2) may be provided in the office 506 and coupled to the network 528. In the illustrated embodiment, a user authentication device 530 (which may be the user authentication system 210 in the power provisioning system 200 of FIG. 2) is provided adjacent the door 518 and coupled to the network 528. However, user authentication devices may be provided in different areas in the physical location 500 (e.g., adjacent the offices 502-506, the conference room 514, etc.) while remaining within the scope of the present disclosure. While a specific embodiment is illustrated in FIG. 5 and described below, one of skill in the art in possession of the present disclosure will recognize that different types and configurations of powered devices may be included in different types of physical locations while remaining within the scope of the present disclosure. In the discussions of the method below, the PSEs 520, 522, 524, the network 528, the couplings between them, and the powered device are not illustrated for clarity.

Figure 6:
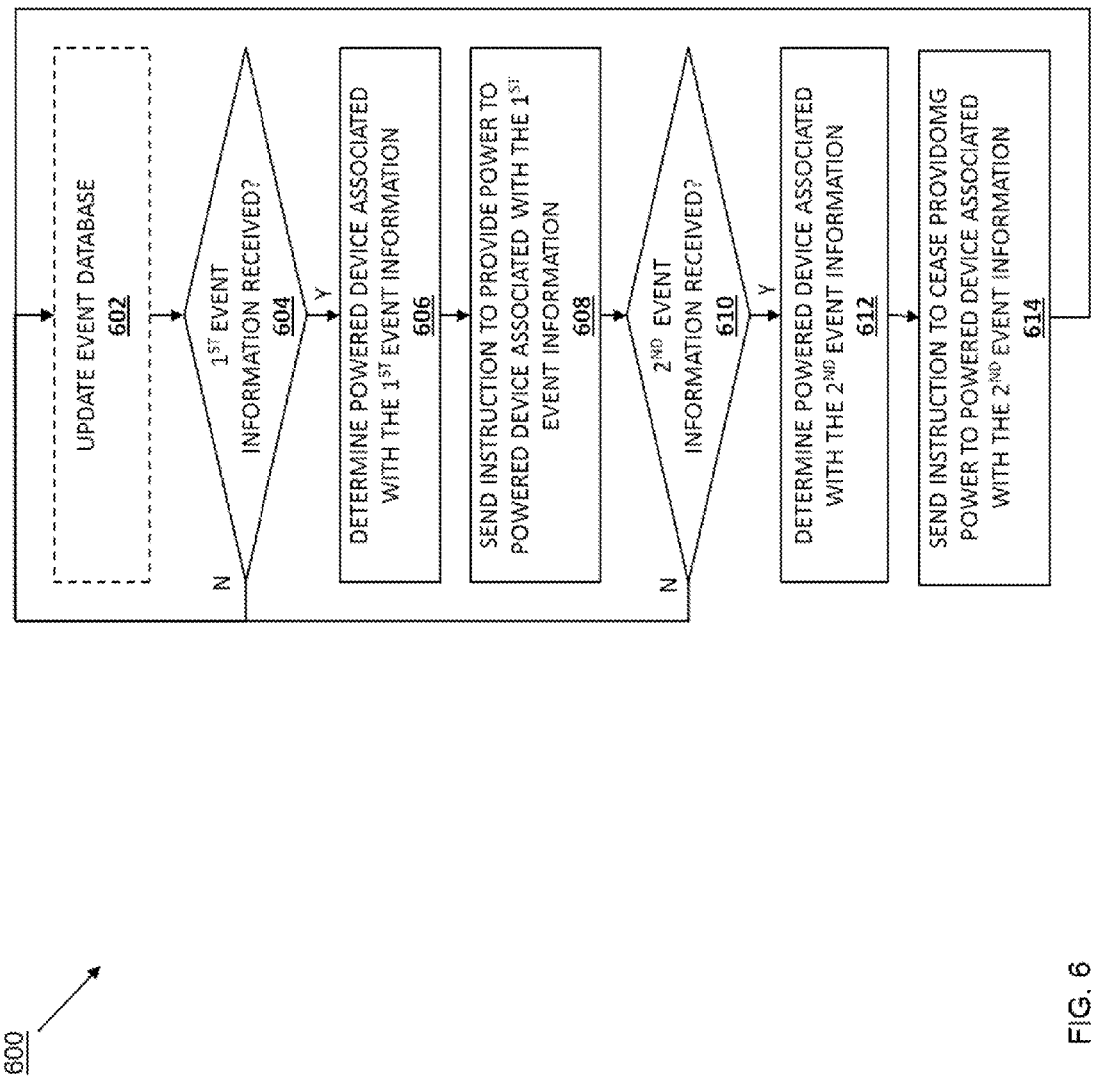
FIG. 6 is a flow chart illustrating an embodiment of a method for providing power to a powered device.

Referring now to FIG. 6, and with reference to FIGS. 7a, 7b, 7c, 7d, and 7e, an embodiment of a method 600 for powering a powered device is illustrated. As discussed below, the method provides for a controller to be notified of events that occur in a power provisioning system that includes PSEs coupled to powered devices and, in response to those events, instruct the PSEs to provide power to powered devices based on event details and network information associated with those events. As such, powered devices may be powered down until an event is detected that indicates that those powered devices may need to be used, and then those powered devices may be powered until another event is detected that indicates those powered devices will no longer be subject to potential use. As such, power used for powering powered devices is conserved, as powered devices are only powered when there is a potential for their use based on detected events. The physical location 500 discussed above with reference to FIG. 5 is included below in FIGS. 7a-7e, with indicators (i.e., the circles in FIGS. 7a-7e) associated with the powered devices provided in black when the powered device is not being provided power by its associated PSE, and with the indicators associated with the powered devices provided in white when the powered device is being provided power by its associated PSE.

The method 600 begins at optional block 602 where an event database is updated. In an embodiment of optional block 602, the controller 202 may receive, determine, or otherwise acquire the network information and/or event definitions discussed above and store that network information and/or event definitions in the event database 206. For example, the event powering engine 302 in the controller 202/300 may receive the updated information for the event database through the communication system 304 and store that updated information in the event database 206 (e.g., in a local storage device, by sending that information back through the communication system 304 to a connected storage device, etc.) In a specific example, at block 602 the PSEs in the power provisioning system 200 may send event details and/or policies that were configured in a PSE interface (e.g., by an administrator), details about each of their connected powered devices (e.g., via inventory management type-length-value (TLV) communication elements), a request to clear powered device details when the associated powered devices are disconnected from the PSE, and/or other information that would allow the functionality discussed below. Similarly, the controller 202 may send any PSE interface, event, and/or powering policies that are configured in the controller 202 (e.g., by an administrator) over the network to one or more of the PSEs at block 602.

In an embodiment, block 602 is optional in that it may not be performed for any given performance of the method 600, it may be performed once for every predetermined number of times the method 600 is performed, etc. As such, optional block 602 allows the power provisioning system 200 to be periodically updated for new and/or changing users, new and/or changing powered devices, new and/or changing physical locations, new and/or changing emergency situations or configurations, new and/or changing scheduled area uses, and/or a variety of other event details and network information that would be apparent to one of skill in the art in possession of the present disclosure.

The method 600 then proceeds to decision block 604 where it is determined whether first event information is received. In an embodiment, at decision block 604, the event powering engine 302 in the controller 202/300 determines whether first event information has been received and, if not, the method 600 returns to optional block 602 and/or decision block 604 to loop through optionally updating the event database 206 and monitoring for first event information. As discussed below, the "first event information" as used in the method 600 illustrated in FIG. 6 refers to powering event information that causes the controller to send an instruction to provide power to at least one of the powered devices. There may be a wide variety of events that may be defined in the event database 206 that will cause a particular powered device in the power provisioning system 200 to receive power, and just a few examples are provided below. Thus, while specific examples are provided, one of skill in the art in possession of the present disclosure will recognize that other first/powering event information may be received at decision block 604 while remaining within the scope of the present disclosure.

Figure 7A:
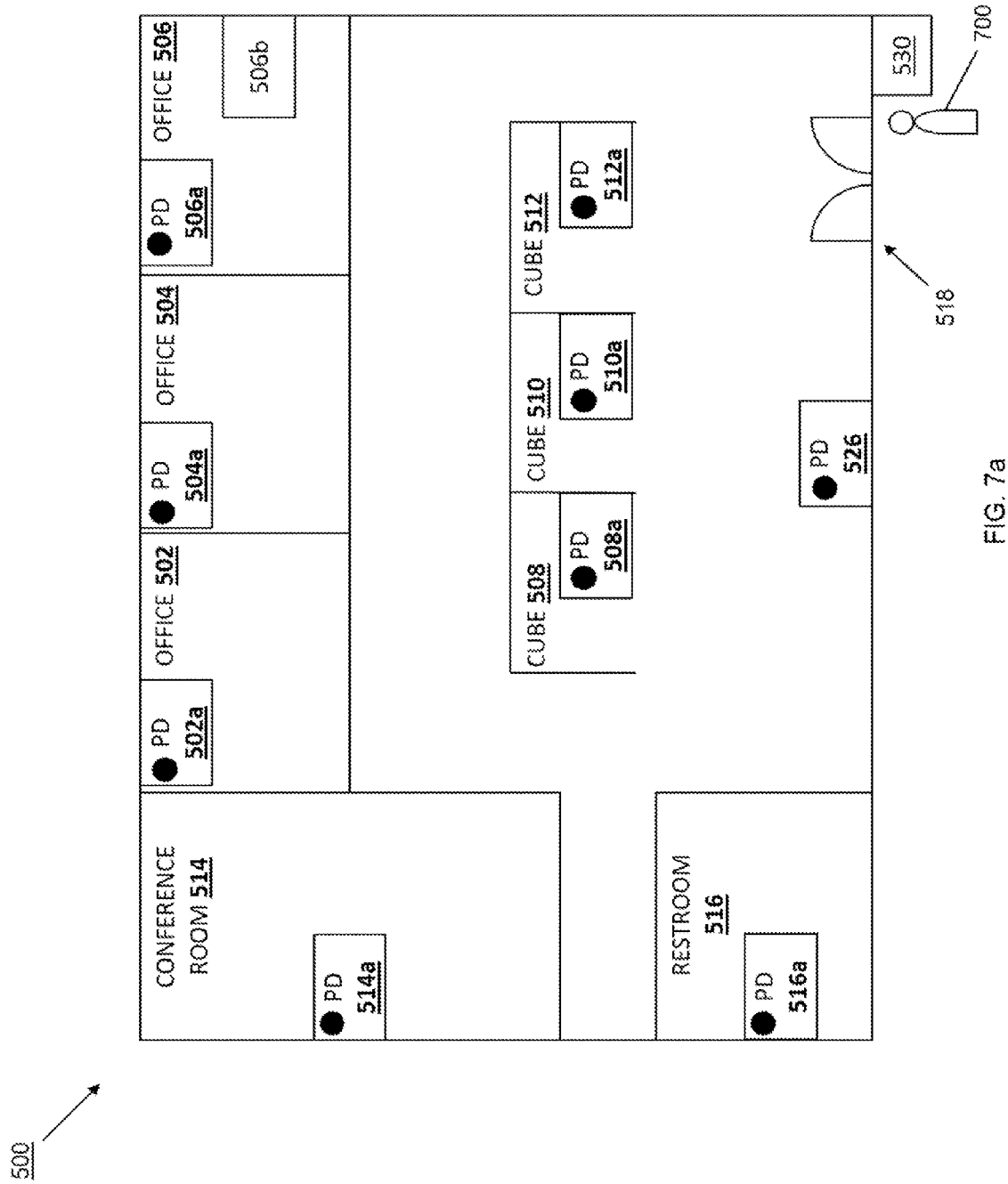
FIG. 7a is a schematic view illustrating an embodiment of the power provision system of FIG. 2 being implemented in the physical location of FIG. 5 in accordance with the method of FIG. 6.

With reference to FIG. 7a, an embodiment of first event information being generated and sent to the controller 202 is illustrated. In this embodiment, a user 700 is illustrated as interacting with the user authentication device 530 at the physical location 500. For example, the user 700 may present an identification card, an authentication card, or other pass card to the user authentication device 530 (e.g., by "swiping" the card, by placing the card within a wireless communication range, etc.) in order to transmit data to the user authentication device 530. In another example, the user 700 may provide biometric information to the user authentication device 530 by, for example, presenting a finger to allow a fingerprint to be scanned, presenting an eye to allow an eye print to be scanned, etc. In yet another example, the user may key in a passcode to the user authentication device 530. While the above example have involved the user 700 providing user-specific information to the user authentication device 530, in some examples the user authentication system 530 may capture user-specific information such as, for example, by capturing an image of the user using a camera and then, in some embodiments, performing facial recognition functions known in the art. As such, at decision block 604 the user 700 may interact with the user authentication system 530 and, in response, the user authentication system 530 may provide any information received and/or retrieved over the network as first event information that is then received by the event powering engine 302 in the controller 202/300.

In some embodiments, the user authentication system 530 may perform processing on information received and/or retrieved from the user 700 by comparing that information to a database of user information and determining whether it is associated with an authenticated user, determining whether it is associated with an identified user, determining a level of access available to the user 700, and/or performing a variety of other security functions known in the art. In other embodiments, the user authentication system 530 may simply pass information received and/or retrieved from the user 700 on to the event powering engine 302 in the controller 202/300, and the event powering engine 302 may process that information by, for example, comparing that information to a database of user information and determining whether it is associated with an authenticated user, determining whether it is associated with an identified user, determining a level of access available to the user 700, and/or performing a variety of other security functions known in the art.

Figure 7B:
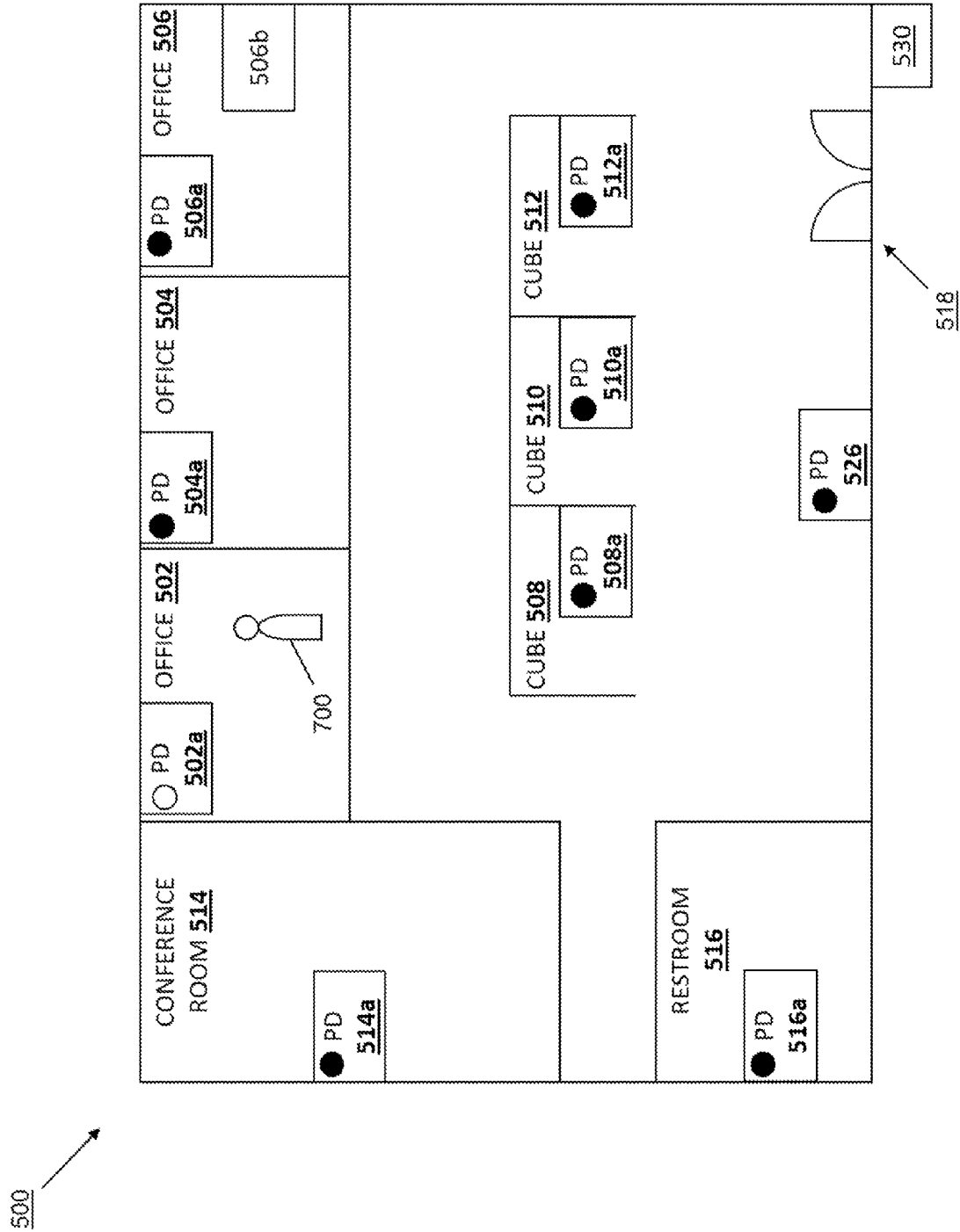
FIG. 7b is a schematic view illustrating an embodiment of the power provision system of FIG. 2 being implemented in the physical location of FIG. 5 in accordance with the method of FIG. 6.
Figure 7C:
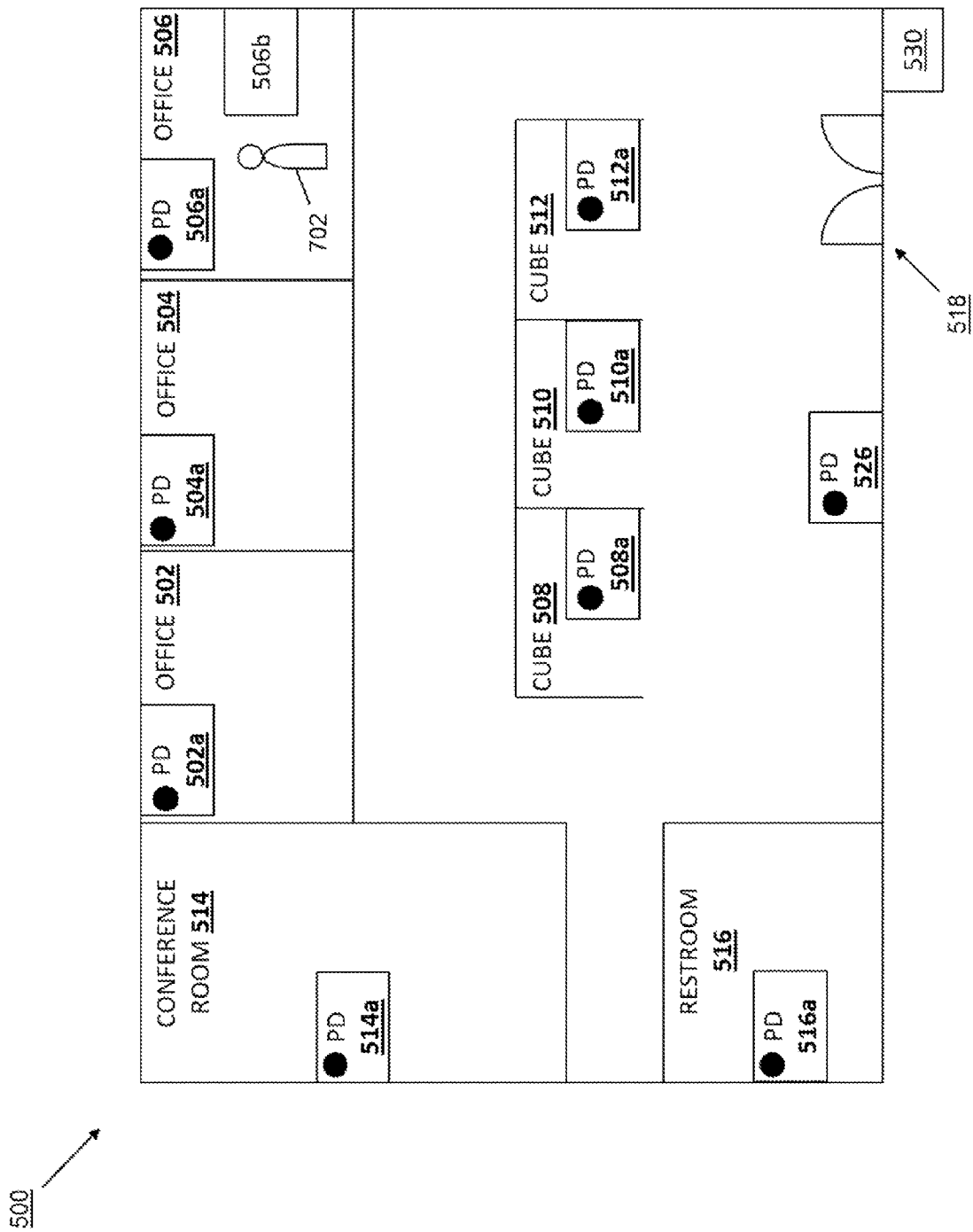
FIG. 7c is a schematic view illustrating an embodiment of the power provision system of FIG. 2 being implemented in the physical location of FIG. 5 in accordance with the method of FIG. 6.

With reference to FIG. 7c, another embodiment of first event information being generated and sent to the controller 202 is illustrated. In this embodiment, a user 702 is illustrated as interacting with the user computing device 506b in the office 506. For example, the user 702 may power on, log into, and/or otherwise prepare the user computing device 506b for use. In some embodiments, the user 702 may connect the user computing device 506b to a docking station or other mobile computing device connection system in the office 506. In yet another embodiment, the user computing device 506b of the user 702 may connect to a Wi-Fi network in the physical location. In yet another embodiment, network traffic may be sent by the user computing device 506b through the network 204 such that it is received and/or intercepted at the controller 202. In response to the user 702 powering on, logging into, physically connecting, communicatively connecting, creating traffic with, or otherwise using the user computing device 506b at the physical location 500, the user computing device 506b may communicate the information discussed above as first event information over the network 204 to the event powering engine 302 to the controller 202/300. In this embodiment, the first event information sent by the user computing device 506b may include identifying information about the user computing device 506b such as, for example, a Media Access Control (MAC) address of the user computing device 506b, an Internet Protocol (IP) address of the user computing device 506b, a serial number of the user computing device 506b, and/or a variety of other computing device identifying information known in the art.

In another embodiment, first event information may include scheduling information that was provided by a user and that is "received" by the controller 202 in response to the controller 202 comparing a current time with a calendar of scheduled information that is stored in the event database 206. For example, in the example using the physical location 500 illustrated in FIG. 5, users may provide scheduled area uses that reserve the use of the conference room 514 for specific dates and/or times (e.g., a scheduled area use for Friday between 1:00 pm and 3:00 pm). In such embodiments, at decision block 604 the controller 202 may monitor the current time and the event database 206, and the first event information is received by the controller 202 when the current time corresponds to the beginning of a scheduled area use.

In another embodiment, first event information may include emergency information that is received by the controller 202 in response to an emergency alert. Using the example including the physical location 500 illustrated in FIG. 5, emergency sensors and/or other emergency monitoring devices (not illustrated) may be positioned around the physical location 500 and configured to report emergency information to the controller 202. For example, fire sensors, gas sensors, and/or other emergency sensors in the physical location 500 may detect data that is indicative of an emergency situation (e.g., heat above a predetermined threshold, gas concentration above a predetermined threshold, etc.), and send the first event information that includes an emergency alert, the monitoring data, and/or other information to the controller 202 at decision block 604. While the emergency sensors have been described as detection sensors, user actuated emergency devices (e.g., panic buttons, distress buttons, cellular devices, etc.) may be provided in the physical location 500 and used to provide the first event information to the controller 202 while remaining within the scope of the present disclosure.

If, at decision block 604, the first event information is received, the method 600 proceeds to block 606 where a powered device that is associated with the first event information is determined. In an embodiment, the event powering engine 302 in the controller 202/300 accesses the event database 206 and determines a powered device in the power provisioning system 200 that is associated with the first event information that was received at decision block 604. The following embodiments of block 606 continue with the examples discussed above, but as discussed above other types of first event information may be received at decision block 604, and thus one of skill in the art in possession of the present disclosure will recognize how that event information may be determined to be associated with a powered device similarly as described below.

Using the example of the first event information that included the user be identified or authenticated via the user authorization device 530, at block 606, the event powering engine 302 may use the first event information to determine a powered device that is associated with the user that was identified or authenticated. For example, with reference to FIG. 7a, the user 700 may be associated with the powered device 502a (or with the office 502 that is associated with the powered device 502a) in the event database 206, and at block 606 the event powering engine 302 may compare the user identity or authentication received in the first event information to the event database 206 to determine the powered device 502a. Using the example of the first event information that included the user computing device communicating identifying information to the controller 202, at block 606, the event powering engine 302 may use the first event information to determine a powered device that is associated with the user computing device identified by the first event information. For example, with reference to FIG. 7c, the user computing device 506b may be associated with the powered device 506a (or with the office 506 that is associated with the powered device 506a) in the event database 206, and at block 606 the event powering engine 302 may compare the user computing device identity received in the first event information to the event database 206 to determine the powered device 506a.

Using the example of the first event information that included the current time coinciding with the beginning of a scheduled area use by the controller 202, at block 606, the event powering engine 302 may use the first event information to determine a powered device that is associated with the scheduled area use identified by the first event information. For example, with reference to FIG. 5, the conference room 514 may be associated with the powered device 514a in the event database 206, and at block 606 the event powering engine 302 may compare the conference room identified by the scheduled area use that was received in the first event information to the event database 206 to determine the powered device 514a. Using the example of the emergency information received by the controller 202, at block 606, the event powering engine 302 may use the first event information to determine a powered device that is associated with the emergency information included in the first event information. For example, with reference to FIG. 5, the office shared area may be associated with the powered device 526 in the event database 206, and at block 606 the event powering engine 302 may compare emergency information that was received in the first event information to the event database 206 to determine the powered device 526.

The method 600 then proceeds to block 608 where an instruction is sent to provide power to the powered device that is associated with the first event information. In an embodiment, at block 608 the event powering engine 302 in the controller 202/300 sends an instruction through the communication system 304 and over the network 204 to the PSE that is coupled to the powered device determined at block 606. The following embodiments of block 608 continue with the examples discussed above, but as discussed above other types of first event information may be received at decision block 604, and powered devices determined at block 606, and thus one of skill in the art in possession of the present disclosure will recognize that those powered devices may be powered according to instructions from the controller similarly as described below.

Using the example of the powered device that was determined to be associated with the user that was identified or authenticated, at block 608 the controller sends the instruction to provide power to that powered device. For example, with reference to FIGS. 7a and 7b, the powered device 502a in the office 502 was determined based on the identified or authenticated user 700, and thus at block 608 an instruction is sent to the PSE that is coupled to the powered device 502*a* to provide power through the one or more ports coupled to the powered device 502*a*. As such, the powered device 502*a* is provided power (as indicated by the circle provided in white) and is available for use by the user 700. Using the example of the powered device that was determined to be associated with the user computing device that was identified, at block 608 the controller sends the instruction to provide power to that powered device. For example, with reference to FIGS. 7*c* and 7*d*, the powered device 506*a* in the office 506 was determined based on the user computing device 506*b* communicating its identity to the controller 202/300, and thus at block 608 an instruction is sent to the PSE that is coupled to the powered device 506*b* to provide power through the one or more ports coupled to the powered device 506*a*. As such, the powered device 506*b* is provided power (as indicated by the circle provided in white) and is available for use by the user 702.

Using the example of the powered device that was determined to be associated with the scheduled area use, at block 608 the controller sends the instruction to provide power to that powered device. For example, with reference to FIG. 7*e*, the powered device 514*a* in the conference room 514 was determined based on the conference room 514 being identified in the scheduled area use, and thus at block 608 an instruction is sent to the PSE that is coupled to the powered device 514*a* to provide power through the one or more ports coupled to the powered device 514*a*. As such, the powered device 514*a* is provided power (as indicated by the circle provided in white) and is available for use by the users 704, 706, and 708 (i.e., attendees of the scheduled area use/meeting that has begun).

Using the example of the powered device that was determined to be associated with the emergency information, at block 608 the controller sends the instruction to provide power to that powered device. In different embodiments, the powered devices that are provided power in response to receiving emergency information may differ in number and location depending on the type of emergency associated with the emergency information. For example, referring to FIG. 7*f*, the powered device 526 in the office shared area may be determined based on the emergency information indicating a relatively low level emergency, and thus at block 608 an instruction is sent to the PSE that is coupled to the powered device 526 to provide power through the one or more ports coupled to the powered device 526. As such, the powered device 526 is provided power (as indicated by the circle provided in white) and is available for use by the users in the office shared area. In another example, referring to FIG. 7*g*, all of the powered devices in the office/physical location 500 may be determined based on the emergency information indicating a relatively high level emergency, and thus at block 608 an instruction is sent to the PSEs that are coupled to the powered devices to provide power through the one or more ports coupled to those powered devices. As such, each of the powered devices is provided power (as indicated by the circles provided in white) and is available for use by the users in the office/physical location 500.

The method 600 may then proceed to decision block 610 where it is determined whether second event information is received. In an embodiment, at decision block 610, the event powering engine 302 in the controller 202/300 determines whether second event information has been received and, if not, the method 600 returns to optional block 602 and/or decision block 604. As discussed below, the "second event information" as used in the method 600 illustrated in FIG. 6 refers to powering-down event information that causes the controller to send an instruction to cease providing power to at least one of the powered devices. Similarly as above, there may be a wide variety of events that may be defined in the event database 206 that will cause a particular powered device in the power provisioning system 200 to cease receiving power, and just a few examples are provided below. Thus, while specific examples are provided, one of skill in the art in possession of the present disclosure will recognize that other second/powering-down event information may be received at decision block 610 while remaining within the scope of the present disclosure.

With reference to FIGS. 7*a* and 7*b*, an embodiment of second event information being generated and sent to the controller 202 is illustrated. In this embodiment, a user 700 may interact with the user authentication device 530 at the physical location 500 substantially as described above, but with the purpose of leaving the physical location 500. As such, the user 700 may present pass cards, biometric information, passcodes, and/or other authentication elements to the user authentication device 530 as the user is leaving the physical location 500. In some examples the user authentication system 530 may capture user-specific information such as, for example, by capturing an image of the user using a camera and then, in some embodiments, performing facial recognition functions known in the art. As such, at decision block 604 the user 700 may interact with the user authentication system 530 and, in response, the user authentication system 530 may provide any information received and/or retrieved over the network as second event information that is then received by the event powering engine 302 in the controller 202/300.

Figure 7D:
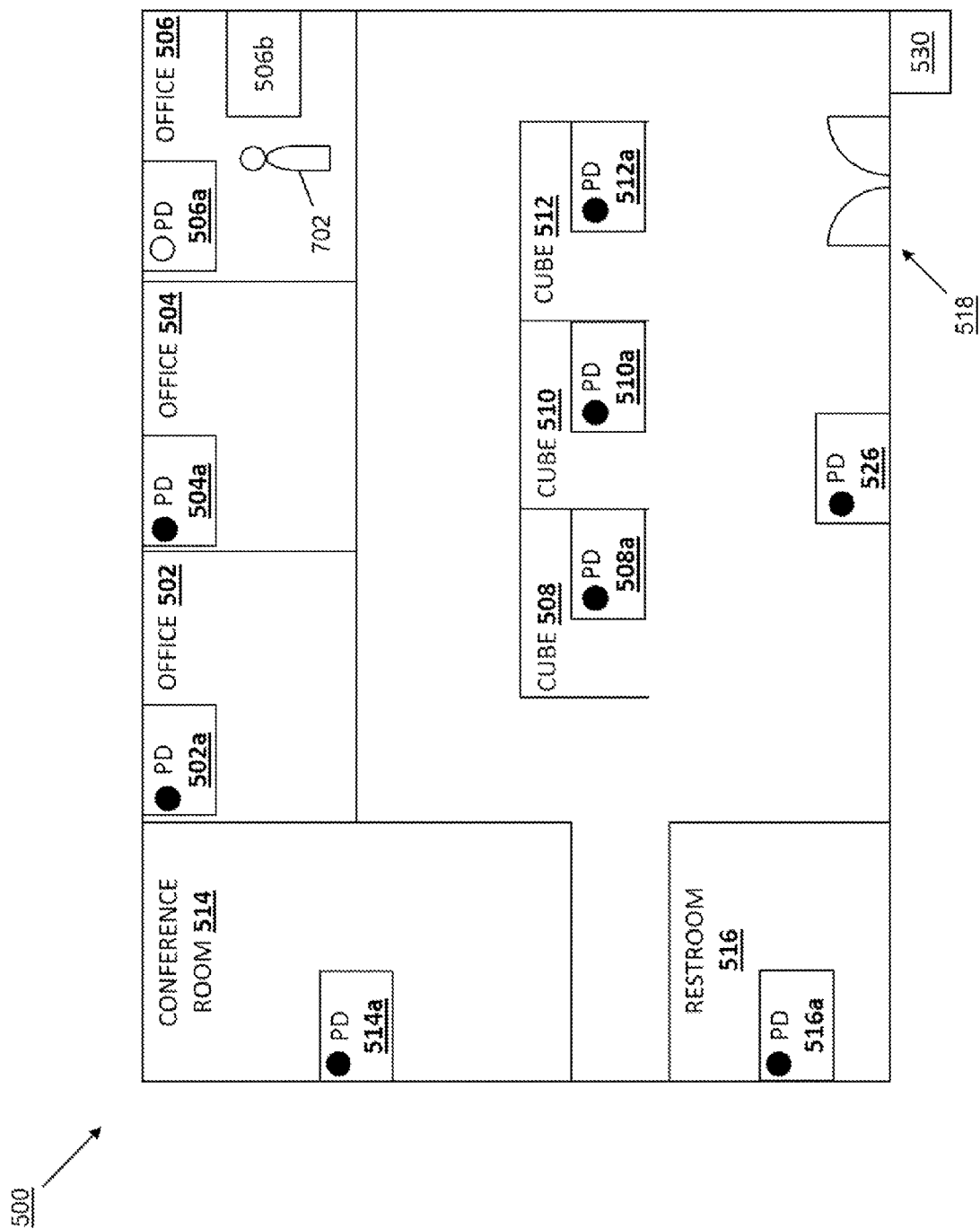
FIG. 7d is a schematic view illustrating an embodiment of the power provision system of FIG. 2 being implemented in the physical location of FIG. 5 in accordance with the method of FIG. 6.
Figure 7E:
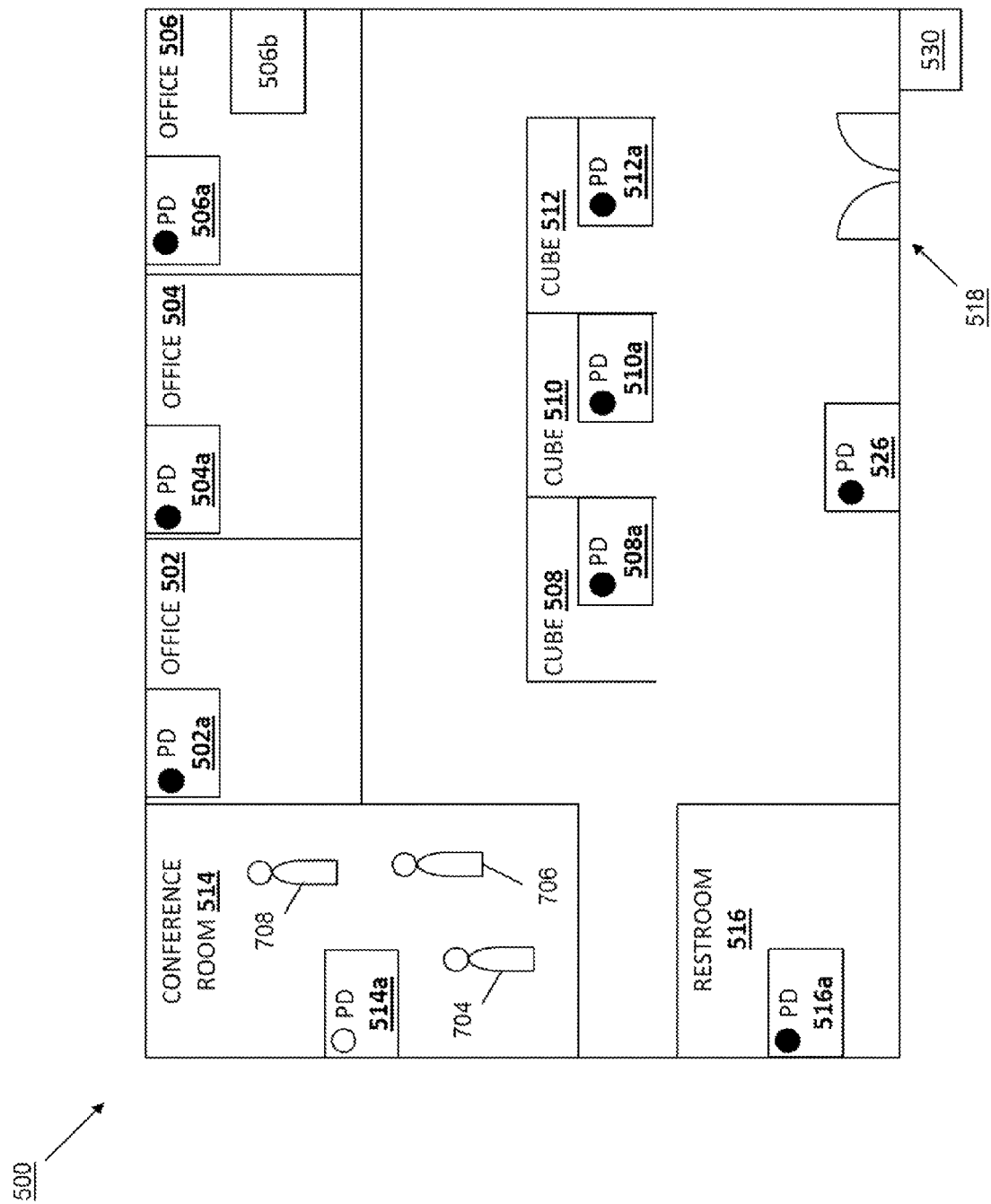
FIG. 7e is a schematic view illustrating an embodiment of the power provision system of FIG. 2 being implemented in the physical location of FIG. 5 in accordance with the method of FIG. 6.
Figure 7F:
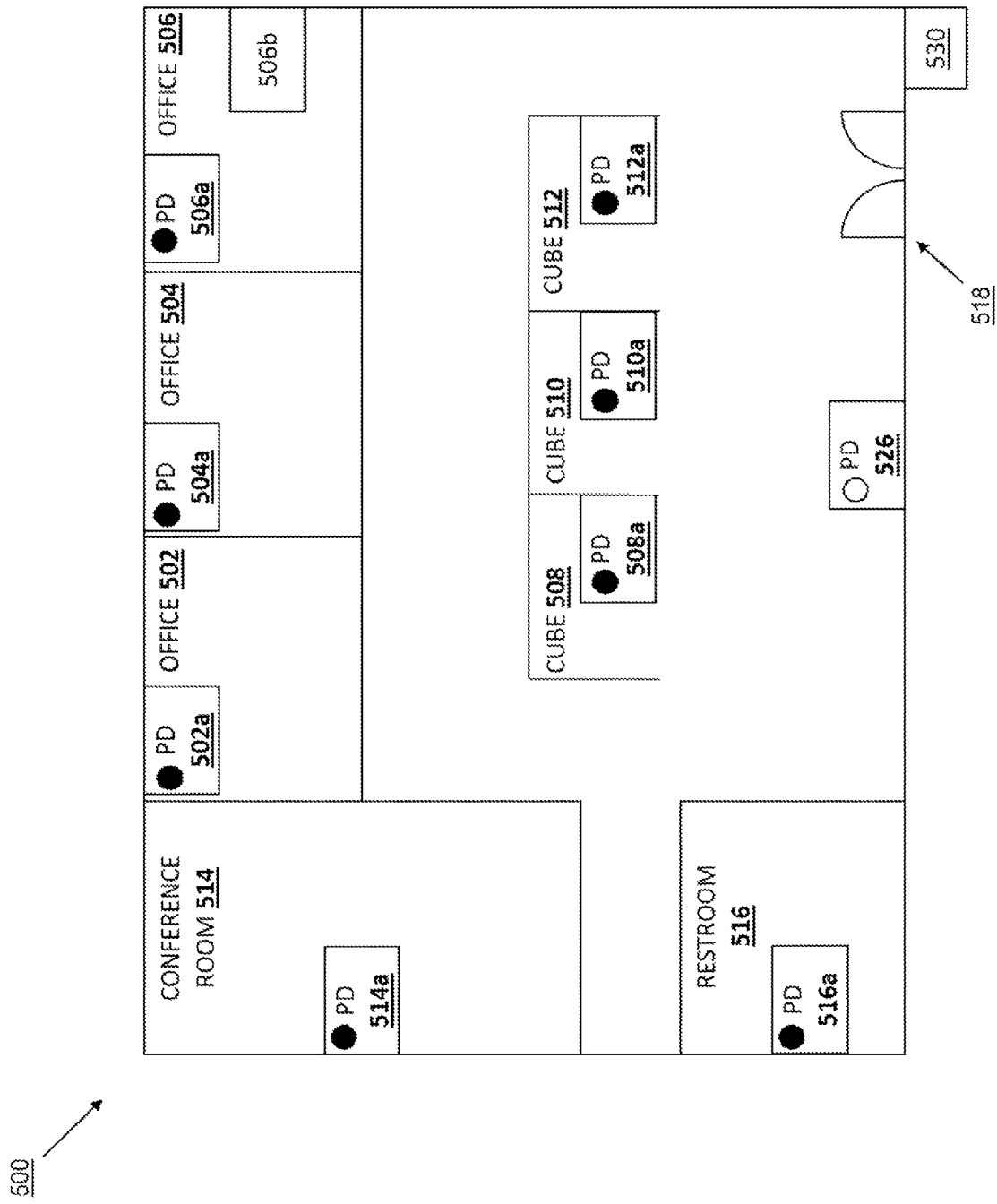
FIG. 7f is a schematic view illustrating an embodiment of the power provision system of FIG. 2 being implemented in the physical location of FIG. 5 in accordance with the method of FIG. 6.
Figure 7G:
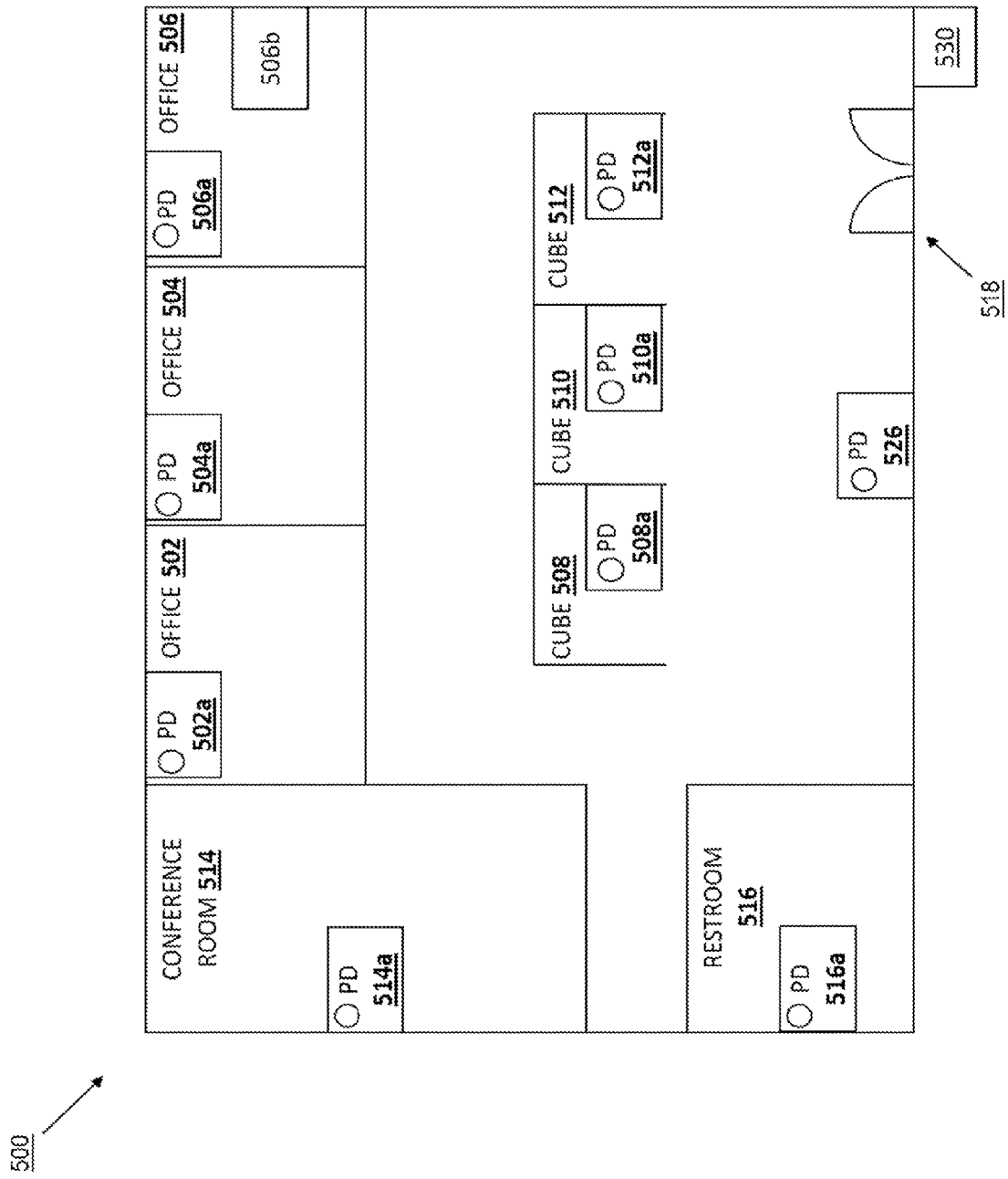
FIG. 7g is a schematic view illustrating an embodiment of the power provision system of FIG. 2 being implemented in the physical location of FIG. 5 in accordance with the method of FIG. 6.

With reference to FIGS. 7*c* and 7*d*, another embodiment of second event information being generated and sent to the controller 202 is illustrated. In this embodiment, the user 702 is illustrated as interacting with the user computing device 506*b* in the office 506. For example, the user 702 may power off, log out of, and/or other prepare the user computing device 506*b* for shutdown or reduced power mode. In some embodiments, the user 702 may disconnect the user computing device 506*b* from a docking station or other mobile computing device connection system. In yet another embodiment, the user computing device 506*b* of the user 702 may disconnect from a Wi-Fi network in the physical location 500. In yet another embodiment, the user computing device 506*b* may cease sending traffic through the network that is received and/or intercepted at the controller 202 (e.g., the event powering engine 302 in the controller 202/400 may determine that traffic from the user computing device 506*b* has not been received in a predetermined amount of time). In response to the user 702 powering off, logging out of, physically disconnecting, communicatively disconnecting, or otherwise ceasing to use the user computing device 506*b*, the user computing device 506*b* may communicate the second event information over the network 204 to the event powering engine 302 in the controller 202/300. In this embodiment, the second event information sent by the user computing device 506*b* may include identifying information about the user computing device 506*b* such as, for example, a Media Access Control (MAC) address of the user computing device 506*b*, an Internet Protocol (IP) address of the user computing device 506*b*, a serial number of the user computing device 506*b*, and/or a variety of other computing device identifying information known in the art.

In another embodiment, second event information may include scheduling information that was provided by a user and that is "received" by the controller 202 in response to the controller 202 comparing a current time with a calendar of scheduled information that is stored in the event database 206. As discussed above, in the example using the physical location 500 illustrated in FIG. 7e, users may provide scheduled area uses that reserve the use of the conference room 514 for specific dates and/or times (e.g., the scheduled area use for Friday between 1:00 pm and 3:00 pm). In such embodiments, at decision block 604 the controller 202 may monitor the current time and the event database 206, and the second event information is received by the controller 202 when the current time corresponds to the end of a scheduled area use. As discussed below, checks may be performed by the controller 202 at the end of a scheduled area use to ensure that power continues to be provided to a powered device if it is currently being used.

In another embodiment, second event information may include emergency information that is received by the controller 202 in response to an emergency alert update. Using the example including the physical location 500 illustrated in FIGS. 7f and 7g, the emergency sensors and/or other emergency monitoring devices positioned around the physical location 500 may report emergency information updates to the controller 202 following an initial emergency alert. For example, fire sensors, gas sensors, and/or other emergency sensors in the physical location 500 may detect data that is indicative of the end of an emergency situation (e.g., heat below a predetermined threshold, gas concentration below a predetermined threshold, etc.), and send the second event information that includes an emergency alert update, the monitoring data, and/or other information to the controller 202/300 at decision block 610. Similarly as above, while the emergency sensors have been described as detection sensors, user actuated emergency devices (e.g., panic buttons, distress buttons, etc.) may be provided in the physical location 500 and used to provide the second event information to the controller 202 (e.g., deactivated to indicate relatively safe conditions) while remaining within the scope of the present disclosure.

If, at decision block 610, the second event information is received, the method 600 proceeds to block 612 where a powered device that is associated with the second event information is determined. In an embodiment, the event powering engine 302 in the controller 202/300 accesses the event database 206 and determines a powered device in the power provisioning system 200 that is associated with the second event information that was received at decision block 510. The following embodiments of block 612 continue with the examples discussed above, but as discussed above other types of second event information may be received at decision block 610, and thus one of skill in the art in possession of the present disclosure will recognize that event information may be determined to be associated with a powered device similarly as described below.

Using the example of the second event information that included the user leaving the physical location 50 subsequent to being identified or authorized by the user authorization device 530, at block 612, the event powering engine 302 may use the second event information to determine a powered device that is associated with the user that has left or is leaving the physical location 500. For example, with reference to FIGS. 7a and 7b, the user 700 may be associated with the powered device 502a (or with the office 502 that is associated with the powered device 502a) in the event database 206, and at block 612 the event powering engine 302 may compare the user identity or authentication received in the second event information to the event database 206 to determine the powered device 502a. Using the example of the second event information that included the user computing device communicating identifying information to the controller 202, at block 612, the event powering engine 302 may use the second event information to determine a powered device that is associated with the user computing device identified by the second event information. For example, with reference to FIGS. 7c and 7d, the user computing device 506b may be associated with the powered device 506a (or with the office 506 that is associated with the powered device 506a) in the event database 206, and at block 612 the event powering engine 302 may compare the identity of the user computing device received in the second event information to the event database 206 to determine the powered device 506a.

Using the example of the second event information that included the current time coinciding with the end of the scheduled area use by the controller 202, at block 612, the event powering engine 302 may use the second event information to determine a powered device that is associated with the end of the scheduled area use identified by the second event information. For example, with reference to FIG. 7e, the conference room 514 may be associated with the powered device 514a in the event database 206, and at block 612 the event powering engine 302 may compare the conference room identified by the scheduled area use that was received in the second event information to the event database 206 to determine the powered device 514a. Using the example of the emergency information received by the controller 202, at block 612, the event powering engine 302 may use the second event information to determine a powered device that is associated with the emergency information included in the second event information. For example, with reference to FIGS. 7f, the office shared area may be associated with the powered device 526 in the event database 206, and at block 612 the event powering engine 302 may compare emergency information that was received in the second event information to the event database 206 to determine the powered device 526.

The method 600 then proceeds to block 614 where an instruction is sent to cease providing power to the powered device that is associated with the second event information. In an embodiment, at block 614 the event powering engine 302 in the controller 202/300 sends an instruction through the communication system 304 and over the network 204 to the PSE that is coupled to the powered device determined at block 612. The following embodiments of block 614 continue with the examples discussed above, but as discussed above other types of second event information may be received at decision block 610, and powered devices determined at block 612, and thus one of skill in the art in possession of the present disclosure will recognize that those powered devices may be powered down according to instructions from the controller similarly as described below.

Using the example of the powered device that was determined to be associated with the user that left or was leaving the physical location 500, at block 614 the controller 202 sends the instruction to cease providing power to that powered device. For example, with reference to FIGS. 7a and 7b, the powered device 502a in the office 502 was determined based on the identified or authenticated user 700 leaving the office 502 and/or the physical location 500, and thus at block 614 an instruction is sent to the PSE that is coupled to the powered device 502a to cease providing power through the one or more ports coupled to the powered device 502*a*. As such, the powered device 502*a* is no longer provided power (as indicated by the circle provided in black in FIG. 7*a*). Using the example of the powered device that was determined to be associated with the user computing device that was powered down, logged off, disconnected, or that ceased sending traffic, at block 614 the controller sends the instruction to cease providing power to that powered device. For example, with reference to FIGS. 7*c* and 7*d*, the powered device 506*a* in the office 506 was determined based on the user computing device 506*b* communicating the second event information to the controller 202/300, and thus at block 614 an instruction is sent to the PSE that is coupled to the powered device 506*a* to cease providing power through the one or more ports coupled to the powered device 506*a*. As such, the powered device 506*a* is no longer provided power (as indicated by the circle provided in black in FIG. 7*c*).

Using the example of the powered device that was determined to be associated with the end of the scheduled area use, at block 614 the controller sends the instruction to cease providing power to that powered device. For example, with reference to FIG. 7*e*, the powered device 514*a* in the conference room 514 was determined based on the conference room 514 being identified in the scheduled area use that was ending, and thus at block 614 an instruction is sent to the PSE that is coupled to the powered device 514*a* to cease providing power through the one or more ports coupled to the powered device 514*a*. As such, the powered device 514*a* is no longer provided power (as indicated by the circle provided in black in FIG. 7*a*).

Using the example of the powered device that was determined to be associated with the end of the emergency situation, at block 614 the controller sends the instruction to cease providing power to that powered device. In different embodiments, the powered devices that are no longer provided power in response to receiving emergency alert updates may differ in number and location depending on the type of emergency associated with the emergency alert update. For example, referring to FIG. 7*f*, because the powered device 526 is the only powered device in the office/physical location 500 being provided power, at block 608 an instruction may only be sent to the PSE that is coupled to the powered device 526 to cease providing power through the one or more ports coupled to the powered device 526 if several emergency alert updates have been received that indicate the emergency situation is over. As such, the powered device 526 may eventually no longer be provided power after receiving multiple emergency alert updates. In another example, referring to FIG. 7*g*, because all of the powered devices in the office/physical location 500 are being provided power, at block 608 an instruction may be sent to the PSEs that are coupled to some subset of the powered devices to cease providing power through the one or more ports coupled to the subset of powered devices based on an initial emergency alert update,. As such, subsets of the powered devices may no longer be provided power as subsequent emergency alert updates are received that indicate that the emergency situation is no longer occurring. Details about which powered devices to cease providing power based on one or more emergency alert updates may be provided by an administrator or determined by the controller 202 and stored in the event database 206.

Subsequent to block 614, the method 600 may return to optional block 602 to cycle through the method 600 again. While specific features of the different embodiments have been described in detail above, other features specific to particular embodiments may be implemented to provide benefits for those embodiments. For example, with reference to FIG. 7*e* and the embodiment in which the powered device 514*a* is provided power in response to the scheduled area use, checks may be made by the controller to determine whether a scheduled area use has "run long" or extended past its scheduled time, or if the powered device 514*a* may otherwise still be subject to use. For example, when the event powering engine 304 determines that a current time corresponds to the end of a scheduled area use, the event powering engine 304 communicate through the communication system 304 and over the network 204 to determine whether the powered device 514*a* is currently being used (e.g., whether an IP phone is currently connected to the network 204 and transmitting data indicative of a phone call). If the powered device 514*a* is currently being used upon the end of a scheduled area use, the event powering engine 302 may not send the instruction to the PSE coupled to the powered device 514*a* to cease providing power to one or more ports connected to the powered device 514*a*, and may check the current use of the powered device 514*a* again after a predetermined amount of time. In addition, if an ended scheduled area use is followed by a new scheduled area use that has begun, the controller 202 may send an instruction to continue to power that powered device (e.g., throughout the new scheduled area use). However, If the powered device 514*a* is not currently being used upon the end of a scheduled area use, the event powering engine 302 may send the instruction to the PSE coupled to the powered device 514*a* to cease providing power to one or more ports connected to the powered device 514*a* as discussed above with reference to block 614.

In another embodiment, powered devices in the power provisioning system 200 may be assigned priority or criticality scores that may be used to help determine when/if those powered devices should be powered down. For example, some powered devices may be assigned high priorities/criticalities such that they are never powered down (e.g., a shared powered IP phone in a common area, an IP phone designated for use in emergency situations, an IP camera, etc.), some powered devices may be assigned medium priorities/criticalities such that they are only powered down in some situations (e.g., a powered IP phone may only be powered down subsequent to a determination of whether it is currently being used), and some powered devices may be assigned low priorities/criticalities such that they are powered down whenever associated second event information is received for them.

In another embodiment, several unique features may be provided on the powered devices for emergency situations. For example, in response to receiving an emergency alert, the controller 202 may send the instruction to provide power to all of the powered devices in the physical location 500 as discussed above. In addition, the controller may send a message about the emergency situation to one or more of the powered IP phones, and those powered IP phones may be configured to make an automated call to a predefined emergency number, play an automated message describing the emergency situation (e.g., a fire), and provide the address and/or other details about the physical location 500. In addition, the priority/criticality scores discussed above for the powered devices may be taken into account for possible emergency situations. For example, some subset of powered IP phones may be designated with a criticality score such that if no users are located in the physical location, all of those powered IP phones are not provided power, but as more users are located in the physical location, more of the powered IP phones are provided power.

Thus, systems and methods have been described that provide for the dynamic powering of powered devices via PSEs in response to events detected and reported through a network. As discussed above, an SDN controller with knowledge of and control over a network may catalogue each of the PSE's and their connected powered devices, and associate users, locations, computing devices, scheduled area uses, and emergency alerts with each of those powered devices as well. When an event associated with a user, location, computing device, scheduled area use, or emergency alert is received, the SDN controller can instruct the appropriate PSE to provide power to the powered device that is associated with the user, location, computing device, scheduled area use, and/or emergency alert. Subsequently, similar events can result in the SDN controller instructing the appropriate PSE to cease providing power to the powered device. As such, powered devices may only be powered in situations where their use is expected or likely, or in situations where it is important that it be available, which conserves power and increase the life of the powered device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power provisioning system, comprising:
power sourcing equipment that includes a plurality of ports, wherein the power sourcing equipment is configured to provide power to each of the plurality of the ports;
a plurality of powered devices that are each coupled to at least one of the plurality of ports; and
a controller that is coupled to the power sourcing equipment through a network and that is configured to:
receive first event information;
determine that the first event information corresponds to a first powered device of the plurality of powered devices and, in response, instruct the power sourcing equipment to provide power to the first powered device through the at least one of the plurality of ports that are coupled to the first powered device while at least one second powered device of the plurality of powered devices remains unpowered through the at least one of the plurality of ports that are coupled to the at least one second powered device;
receive second event information; and
determine that the second event information includes an emergency alert that corresponds to the at least one second powered device and, in response, instruct the power sourcing equipment to provide power to the at least one second powered device through the at least one of the plurality of the ports that are coupled to the at least one second powered device.

2. The system of claim 1 further comprising:
a user authentication system that is coupled to the controller through the network and that is configured to receive user identification information that is associated with an identified user and, in response, generate the first event information and provide the first event information to the controller.

3. The system of claim 2, wherein the determining that first event information corresponds to the first powered device of the plurality of powered devices includes the controller determining that the identified user is associated with the first powered device and the first powered device is associated with the at least one port in an event database that is coupled to the controller.

4. The system of claim 1, wherein the controller is configured to:
receive third event information; and
determine that the third event information corresponds to the first powered device of the plurality of powered devices and, in response, instruct the power sourcing equipment to cease providing power to the first powered device through the at least one of the plurality of ports that are coupled to the first powered device.

5. The system of claim 1, wherein the determining that the first event information corresponds to the first powered device of the plurality of powered devices includes the controller determining that a scheduled area use is associated with the first powered device and the first powered device is associated with the at least one port in an event database that is coupled to the controller.

6. The system of claim 5, wherein the controller is configured to:
determine that a time period associated with the schedule area use has ended and, in response, determine whether the first powered device is currently being used,
wherein, in response to determining that the first powered device is not currently being used, the controller is configured to instruct the power sourcing equipment to cease providing power to the first powered device through the at least one of the plurality of ports that are coupled to the first powered device.

7. The system of claim 1, wherein the wherein the controller is configured to:
determine that the second event information includes high level emergency alert and, in response, instruct the power sourcing equipment to provide power to all of the plurality of powered devices through the at least one of the plurality of ports that are coupled to the plurality of powered devices.

8. An information handling system (IHS), comprising:
a communication system that is configured to couple to a network;
a processing system that is coupled to the communication system; and
a memory system that is coupled to the processing system and that includes instruction that, when executed by the processing system, cause the processing system to provide an event powering engine that is configured to:
receive, using the communication system, first event information through the network;
determine that the first event information corresponds to a first powered device in an event database; and
send an instruction to power sourcing equipment that is coupled to the network to provide power to a first powered device through at least one first port that is included on the power sourcing equipment and that is coupled to the first powered device while at least one second port that is included on the power sourcing equipment and that is coupled to at least one second powered device remains unpowered;
receive, using the communication system, second event information; and
determine that the second event information includes an emergency alert that corresponds to the at least one second powered device and, in response, send an instruction to the power sourcing equipment to provide power through the at least one second port that is included on the power sourcing equipment and that is coupled to the at least one second powered device.

9. The IHS of claim 8, wherein the first event information is received from a user authentication system that is coupled to the network in response to the user authentication system receiving user identification information that is associated with an identified user.

10. The IHS of claim 9, wherein the determining that the first event information corresponds to the first powered device includes determining that the identified user is associated with the first powered device and the first powered device is associated with the at least one port that is coupled to the first powered device.

11. The IHS of claim 8, wherein the event powering engine is configured to:
receive, using the communication system, third event information; and
determine that the third event information corresponds to the first powered device of the plurality of powered devices and, in response, send an instruction to the power sourcing equipment to cease providing power to the first powered device through the at least one first port that is included on the power sourcing equipment and that is coupled to the first powered device.

12. The IHS of claim 8, wherein the determining that the first event information corresponds to the first powered device further includes determining that a scheduled area use is associated with the first powered device and the first powered device is associated with the at least one first port in the event database.

13. The IHS of claim 12, wherein the determining that the scheduled area use is associated with the first powered device includes determining that a time period associated with the schedule area use has ended and, in response, determining whether the first powered device is currently being used;
wherein, in response to determining that the first powered device is not currently being used, the event powering engine is configured to send an instruction to the power sourcing equipment to cease providing power to the first powered device through the at least first port that is included on the power sourcing equipment and that is coupled to the first powered device.

14. A method for powering a powered device, comprising:
receiving, by a controller through a network, first event information;
determining, by the controller, that the first event information corresponds to a first powered device in an event database; and
sending, by the controller through the network to power sourcing equipment, an instruction to provide power to the first powered device through at least one first port that is included on the power sourcing equipment and that is coupled to the first powered device while at least one second port that is included on the power sourcing equipment and that is coupled to a second powered device remains unpowered;

receive, by the controller through the network, second event information; and
determine, by the controller, that the second event information includes an emergency alert and, in response, send an instruction through the network to the power sourcing equipment to provide power to the second device through at least one second port that is included on the power sourcing equipment and that is coupled to the second powered device.

15. The method of claim 14, further comprising:
receiving, by the controller through the network from a user authentication system, the first event information in response to the user authentication system receiving user identification information that is associated with an identified user.

16. The method of claim 15, wherein the determining that the first event information corresponds to the first powered device in the event database includes determining that the identified user is associated with the first powered device in the event database, and the first powered device is associated with the at least one first port in the event database.

17. The method of claim 14, wherein the determining that the first event information corresponds to the first powered device in the event database includes determining that a scheduled area use is associated with the first powered device in the event database, and the first powered device is associated with the at least one first port in the event database.

18. The method of claim 17, further comprising:
determining, by the controller, that a time period associated with the schedule area use has ended; and
determining that the first powered device is not currently being used and, in response, sending an instruction to the power sourcing equipment to cease providing power to the first powered device through the at least one first port that is coupled to the first powered device.

19. The method of claim 14, further comprising:
determining, by the controller, that the second event information includes a high level emergency alert and, in response, send an instruction to the power sourcing equipment to provide power to each of the at least one first port that is included on the power sourcing equipment and that is coupled to first powered device, the at least one second port that is included on the power sourcing equipment and that is coupled to second powered device, and at least one third port that is included on the power sourcing equipment and that is coupled to at least one third powered device.

20. The method of claim 14, further comprising:
receiving, by the controller, third event information;
determining, by the controller, that the third event information corresponds to the first powered device in the event database; and
sending, by the controller through the network to power sourcing equipment, an instruction to cease providing power to the first powered device through at least one first port that is included on the power sourcing equipment and that is coupled to the first powered device.

* * * * *

UNITED STATES PATENT AND TRADEMARK OFFICE
CERTIFICATE OF CORRECTION

| | | |
|---|---|---|
| PATENT NO. | : 9,612,642 B2 | Page 1 of 1 |
| APPLICATION NO. | : 14/726036 | |
| DATED | : April 4, 2017 | |
| INVENTOR(S) | : Purushothaman Ramalingam and Premnath Sundarababu | |

It is certified that error appears in the above-identified patent and that said Letters Patent is hereby corrected as shown below:

In the Claims

In Column 19, Line 57: In Claim 1, please delete "the" before ports;

In Column 22, Line 6: In Claim 14, please insert --powered-- after second.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*